Patented Nov. 10, 1925.

1,560,933

UNITED STATES PATENT OFFICE.

UMEJIRO EMURA, OF TOKYO, JAPAN, ASSIGNOR TO TEIJI YAMANOUCHI, OF TOKYO, JAPAN.

GALVANIZING FLUX.

No Drawing.   Application filed May 26, 1922. Serial No. 563,964.

*To all whom it may concern:*

Be it known that UMEJIRO EMURA, a subject of the Emperor of Japan, residing at No. 99 Kaminakasato, Takinogawa, Kitatoshima-gori, Tokyo Prefecture, Japan, has invented certain new and useful Improvements in Galvanizing Flux, of which the following is a specification.

This invention relates to improvements in the manufacture of galvanized sheet-iron in which proper quantities of the following sorts of substances, i. e., metallic strontium or strontium compounds, sulphur, carbonates or sulphur compounds, chlorides, and metallic bismuth or bismuth compounds are previously added to ammonium chloride which has been hitherto used to protect molten zinc from oxidation. The objects of this invention are to give greater brightness to galvanized sheet-iron as well as to increase its resistance to oxidation.

According to my experiments the galvanized sheet-iron does not show any improved brightness when it is manufactured by immersing sheet-iron in molten zinc covered with molten ammonium chloride, the hitherto used oxidation preventing agent, mixed with only metallic strontium or its compounds, for instance, strontium carbonate. The strontium bearing compound and ammonium chloride, even after the addition of sulphur, does not improve the brightness of the surface of the galvanized sheet, when applied thereto. But when proper quantities of a chloride such as sodium chloride or potassium chloride and a sulphur compound such as sodium sulphide or potassium sulphide, or a carbonate such as sodium carbonate or potassium carbonate which forms a sulphide with the sulphur previously mixed, are added, the surface of galvanized sheet-iron exhibits lustre. When the sheet-iron is galvanized after addition of metallic bismuth or its compounds such as basic bismuth carbonate, bismuth nitrite or bismuth sulphide to the flux, the surface is found to show fine lustre and strong brightness which are lacking in the above cases. The function of each substance for the appearance of lustre and brightness is not clear but the formation of complex compounds produced by the mutual action of the sulphide such as strontium sulphide, bismuth sulphide, sodium sulphide or potassium sulphide and the chloride such as sodium chloride or potassium chloride, and especially the existence of bismuth sulphide are thought to be the main factors.

In carrying out these experiments technically on a larger scale, the mixture of the following proportion by weight is used.

| | |
|---|---|
| Metallic strontium or its compounds | 70–125 |
| Sulphur (sulphur of 50% purity may be used) | 60–125 |
| Sulphur compounds or carbonates | 10– 20 |
| Metallic bismuth or its compounds | 20– 30 |
| Chlorides | 3– 5 |

Further details are shown in the following examples:—

| | | |
|---|---|---|
| Ex. 1. | Metallic strontium | 73.5 |
| | Sulphur, pure | 48.0 |
| | Metallic bismuth | 18.5 |
| | Sodium carbonate | 13.5 |
| | Sodium chloride | 5.0 |
| Ex. 2. | Strontium chloride | 100.0 |
| | Sodium sulphide | 10.0 |
| | Bismuth sulphide | 20.0 |
| | Sodium chloride | 5.0 |
| Ex. 3. | Strontium carbonate | 124.0 |
| | Sulphur, pure | 62.5 |
| | Basic bismuth carbonate | 22.7 |
| | Sodium carbonate | 13.6 |
| | Sodium chloride | 5.0 |
| Ex. 4. | Strontium carbonate | 124.0 |
| | Sulphur, pure | 62.5 |
| | Bismuth nitrite | 25.6 |
| | Sodium carbonate | 13.6 |
| | Sodium chloride | 5.0 |

Since bismuth nitrite is cheapest of the bismuth containing materials, the mixture with the proportion mentioned in Example 4 is highly economical and of practical use.

In the manufacture of galvanized sheet-iron, 2–3% of the above mixture is added to ammonium chloride which has been hitherto used to protect molten zinc from oxidation. In practice, the mixture covers the surface of molten zinc 2–3 inches thick. When the mutual action in the mixture is completed by the heat of molten zinc, sheet-iron is immersed in the bath.

When ammonium chloride alone is used as hitherto, molten zinc is protected from oxidation during the operation. The surface of the finished galvanized sheet-iron, however, assumes white color after 2–3 weeks owing to the oxidation by air. But according to the present method, the finished sheet-iron is covered by certain mixtures which keep the product permanently in bright and lustrous state, thus enabling the manufacturer to furnish improved galvanized sheet-iron.

I claim—

1. A galvanizing flux comprising ammonium chloride, a strontium bearing material, sulphur, a bismuth bearing material, and alkali metal compounds, substantially as set forth.

2. A galvanizing flux comprising a large proportion of ammonium chloride mixed with a few per cent of its weight of strontium-containing and bismuth-containing materials, an alkali metal chloride and sulfur.

3. A galvanizing flux containing ammonium chlorid mixed with about 2 to 3% of its weight of a mixture containing strontium carbonate, about 124 parts; sulfur, about 62.5 parts; bismuth nitrite, about 25.6 parts; sodium carbonate, about 13.6 parts; sodium chloride, about 5 parts.

In testimony whereof he affixes his signature.

UMEJIRO EMURA.